US008824329B2

(12) United States Patent
Zhang et al.

(10) Patent No.: US 8,824,329 B2
(45) Date of Patent: Sep. 2, 2014

(54) METHOD FOR REPORTING AND OBTAINING CHANNEL STATE INFORMATION, ENODEB, AND USER EQUIPMENT

(75) Inventors: Xingwei Zhang, Beijing (CN); Yongxia Lv, Beijing (CN); Yan Cheng, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 13/590,987

(22) Filed: Aug. 21, 2012

(65) Prior Publication Data

US 2012/0314613 A1 Dec. 13, 2012

Related U.S. Application Data

(63) Continuation of application No. PCT/CN2011/072658, filed on Apr. 12, 2011.

(30) Foreign Application Priority Data

Jul. 8, 2010 (CN) .......................... 2010 1 0225195
Oct. 28, 2010 (CN) .......................... 2010 1 0523222

(51) Int. Cl.
*G01R 31/08* (2006.01)
(52) U.S. Cl.
USPC ....................................... 370/252
(58) Field of Classification Search
None
See application file for complete search history.

(56) References Cited

U.S. PATENT DOCUMENTS

| 2005/0063389 | A1 | 3/2005 | Elliott et al. |
| 2008/0305745 | A1 | 12/2008 | Zhang et al. |
| 2009/0207784 | A1* | 8/2009 | Lee et al. ............... 370/328 |
| 2010/0098012 | A1* | 4/2010 | Bala et al. .............. 370/329 |
| 2010/0103891 | A1 | 4/2010 | Okubo |
| 2010/0214937 | A1* | 8/2010 | Chen et al. ............. 370/252 |
| 2011/0002290 | A1 | 1/2011 | Kim et al. |
| 2011/0249578 | A1* | 10/2011 | Nayeb Nazar et al. ....... 370/252 |
| 2012/0327785 | A1 | 12/2012 | Zhang et al. |

FOREIGN PATENT DOCUMENTS

| CN | 1917492 A | 2/2007 |
| CN | 101426225 A | 5/2009 |
| CN | 101615984 A | 12/2009 |

(Continued)

OTHER PUBLICATIONS

"Periodic CQI/PMI/RI reporting for CA", Huawei, Hisilicon, 3GPP TSG RAN WG1 Meeting#63, Jacksonville, Florida, Nov. 15-19, 2010, 5 pages.

(Continued)

*Primary Examiner* — Minh-Trang Nguyen
(74) *Attorney, Agent, or Firm* — Huawei Technologies Co., Ltd.

(57) ABSTRACT

A method for reporting and obtaining channel state information, an eNodeB, and a user equipment are disclosed. The method for reporting channel state information includes: determining a reported content in channel state information (CSI) of downlink component carriers according to priorities of contents-in-CSI, where the CSI of the downlink component carriers includes the reported content and a content that is not to be reported; and reporting the reported content to an eNodeB on a physical uplink control channel (PUCCH). By determining a reported content in CSI according to a priority, the shortage of a CSI reporting resource may be relieved.

8 Claims, 4 Drawing Sheets

(56) References Cited

FOREIGN PATENT DOCUMENTS

| CN | 101621359 A | 1/2010 |
|---|---|---|
| CN | 101682934 A | 3/2010 |
| CN | 101772050 A | 7/2010 |
| CN | 102013954 A | 4/2011 |
| KR | 20080029912 A | 4/2008 |
| WO | WO 2009/002087 A1 | 12/2008 |
| WO | WO 2009/088225 A2 | 7/2009 |
| WO | WO 2009/096757 A2 | 8/2009 |
| WO | WO 2009/102251 A2 | 8/2009 |
| WO | 2009123549 A2 | 10/2009 |

OTHER PUBLICATIONS

"Periodic CQI Reporting for Carrier Aggregation", Panasonic, 3GPP TSG-RAN WG1 Meeting 60bis, Apr. 12-16, 2010, Beijing, China, 3 pages.

International Search Report dated Jul. 21, 2011 in connection with International Patent Application No. PCT/CN2011/072658.

"Discussion on the priority among CCs", Huawei, HiSilicon, 3GPP TSG RAN WG1 Meeting#64, Taipei, Feb. 21-25, 2011, 3 pages.

"Evolved Universal Terrestrial Radio Access (E-UTRA); Physical layer procedures (3GPP TS 36.213 version 9.2.0 Release 9)", ETSI TS 136 213 v9.2.0, Jun. 2010, 82 pages.

Partial Translation of Written Opinion of the International Searching Authority dated Jul. 21, 2011 in connection with International Patent Application No. PCT/CN2011/072658.

Supplementary European Search Report dated Mar. 5, 2013 in connection with European Patent Application No. EP 11 78 0097.

"Priority rules for periodic CSI feedback in carrier aggregation", Samsung, 3GPP TSG RAN WG1 Meeting #64, Feb. 21-25, 2011, 3 pages.

"E-UTRA PUCCH: ACK/NACK, CQI, PMI, and RI Issues", InterDigital Communications, LLC, 3GPP TSG RAN WG1 Meeting #50bis, Oct. 8-12, 2007, 7 pages.

Search Report dated Apr. 8, 2013 in connection with Chinese Patent Application No. 2011103101725.

Partial translation of Office Action dated Apr. 23, 2013 in connection with Chinese Patent Application No. 2011103101725.

3GPP TSG-RAN WG1 Meeting 60 R1-101258,"Periodic CQI Reporting for Carrier Aggregation",Panasonic, Feb. 22-26, 2010,total 3 pages.

* cited by examiner

METHOD FOR REPORTING AND OBTAINING CHANNEL STATE INFORMATION, ENODEB, AND USER EQUIPMENT

CROSS-REFERENCE TO RELATED APPLICATIONS

This application is a continuation of International Application No. PCT/CN2011/072658, filed on Apr. 12, 2011, which claims priority to Chinese Patent Application No. 201010225195.1, filed on Jul. 8, 2010 and Chinese Patent Application No. 201010523222.3, filed on Oct. 28, 2010, all of which are hereby incorporated by reference in their entireties.

TECHNICAL FIELD

The present invention relates to the field of communications technologies, and in particular, to a method for reporting and obtaining channel state information, an eNodeB, and a user equipment.

BACKGROUND

In a long term evolution-advanced (Long Term Evolution, hereinafter referred to as LTE-A) system, a user equipment (User Equipment, hereinafter referred to as UE) needs to report some channel state information (Channel State Information, hereinafter referred to as CSI) to an eNodeB (hereinafter referred to as eNodeB). The CSI may include: a channel quality indicator (Channel Quality Indicator, hereinafter referred to as CQI), a precoding matrix indicator (Precoding Matrix Indicator, hereinafter referred to as PMI), and a rank indicator (Rank Indicator, hereinafter referred to as RI). The eNodeB may determine a modulation and coding scheme (Modulation and Coding Scheme, hereinafter referred to as MCS) used in downlink according to received channel state information. To satisfy an LTE-A requirement for supporting a peak data rate up to 1 Gbit/s, a carrier aggregation (Component Aggregation, hereinafter referred to as CA) technology is used as a method for extending system bandwidth in the Rel-10 of the LTE-A system. The main conception of the CA is to aggregate multiple component carriers (Component Carrier, hereinafter referred to as CC) into a carrier whose frequency is higher than 20 MHz, so as to support a high-speed data rate. In a CA scenario in the Rel-10, the maximum number of CCs is 5. Among multiple uplink CCs, only one uplink CC, that is, a main carrier, has a physical uplink control channel (Physical Uplink Control Channel, hereinafter referred to as PUCCH), and periodical CSI information needs to be reported on the PUCCH to ensure a low block error rate (Block Error Rate, hereinafter referred to as BLER).

In the prior art, when CSI of multiple downlink CCs need to be reported, the downlink CCs need to be sorted according to a priority. CSI of a downlink CC with a lower priority is dropped as a whole, and CSI of a downlink CC with a highest priority is reported on the PDCCH of one CC. In the prior art, the CSI of the downlink CC with a lower priority may not be reported in a long period and the reported CSI cannot reflect a channel state in a CA scenario accurately, which leads to low precision of reporting.

SUMMARY

Embodiments of the present invention provide a method for reporting and obtaining channel state information, an eNodeB, and a user equipment.

An embodiment of the present invention provides a method for reporting channel state information (CSI), where the method includes:

obtaining CSI of downlink component carriers;

determining a reported content in the CSI of the downlink component carriers according to priorities of contents-in-CSI; and reporting the reported content to an eNodeB on a physical uplink control channel (PUCCH).

An embodiment of the present invention further provides a user equipment, including:

an information obtaining unit, configured to obtain channel state information (CSI) of downlink component carriers;

a unit for determining a reported content, configured to determine a reported content in the CSI of the downlink component carriers according to priorities of contents-in-CSI; and a unit for sending a reported content, configured to report the reported content to an eNodeB on a physical uplink control channel (PUCCH).

With the foregoing technical solutions, according to a priority order of the contents of the CSI, the reported content may be determined in the CSI and reported to the eNodeB, and a content that is not to be reported does not need to be reported, which may reduce the amount of reported information, so that a resource for reporting the CSI is saved, and meanwhile, a loss caused by dropping CSI of a certain CC as a whole may be reduced.

An embodiment of the present invention further provides a method for reporting channel state information, where the method includes:

obtaining channel state information (CSI) of multiple downlink component carriers (CCs); and sending reported information to an eNodeB on a physical uplink control channel (PUCCH) of an uplink subframe, where the reported information includes at least part of CSI of each downlink CC in at least two CCs of the multiple downlink CCs.

An embodiment of the present invention further provides a method for obtaining channel state information, where the method includes:

receiving an uplink subframe sent by a user equipment;

obtaining reported information on a physical uplink control channel (PUCCH) of the uplink subframe, where the reported information includes at least part of CSI of each downlink CC in at least two downlink CCs; and performing restoration processing on the reported information on the PUCCH of the uplink subframe, to obtain the CSI of the each downlink CC in the at least two downlink CCs.

An embodiment of the present invention further provides a user equipment, including:

a first obtaining module, configured to obtain channel state information (CSI) of multiple downlink component carriers (CCs); and a first sending module, configured to send reported information to an eNodeB on a physical uplink control channel (PUCCH) of an uplink subframe, where the reported information includes at least part of CSI of each downlink CC in at least two CCs of the multiple downlink CCs.

An embodiment of the present invention further provides an eNodeB, including:

a receiving module, configured to receive an uplink subframe sent by a user equipment;

a second obtaining module, configured to obtain reported information on a physical uplink control channel (PUCCH)

of the uplink subframe, where the reported information includes at least part of CSI of each downlink CC in at least two downlink CCs; and a restoration processing module, configured to perform restoration processing on the reported information on the PUCCH of the uplink subframe, to obtain the CSI of the each downlink CC in the at least two downlink CCs.

In the embodiments of the present invention, the UE may control and process CSI of at least two downlink CCs that needs to be reported, so that the UE may report CSI of each downlink CC in one uplink CC in a CA scenario, thereby reducing a resource overhead.

BRIEF DESCRIPTION OF THE DRAWINGS

To describe the technical solutions in the embodiments of the present invention or in the prior art more clearly, the accompanying drawings required for describing the embodiments or the prior art are briefly introduced in the following. Apparently, the accompanying drawings in the following description are about only some embodiments of the present invention, and persons of ordinary skill in the art may still derive other drawings from these accompanying drawings without making creative efforts.

DETAILED DESCRIPTION

The technical solutions in the embodiments of the present invention are clearly and completely described with reference to the accompanying drawings in the embodiments of the present invention. Apparently, the embodiments to be described are only part of rather than all of the embodiments of the present invention. Based on the embodiments of the present invention, all other embodiments obtained by those skilled in the art without making creative efforts shall fall within the protection scope of the present invention.

Figure 1:
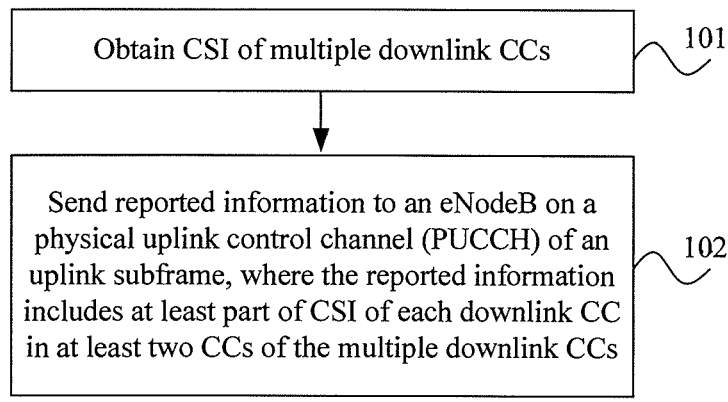
FIG. 1 is a flowchart of a method for reporting channel state information according to an embodiment of the present invention.

FIG. 1 is a flowchart of a method for reporting channel state information according to an embodiment of the present invention. As shown in FIG. 1, the method in this embodiment includes:

Step 101: Obtain CSI of multiple downlink CCs.

When a UE needs to report CSI of at least two downlink CCs to an eNodeB, the UE may obtain the CSI of multiple downlink CCs. It should be noted that, a method for the UE to obtain the CSI may be implemented by using conventional technologies, such as reference signal measurement and interpolation estimation, which is not detailed here again.

In an LTE-A system, modes for reporting CSI periodically on a PUCCH mainly include a periodical wideband (Wide Band, hereinafter referred to as WE) reporting mode and a periodical frequency-selective reporting mode. In the periodical WE reporting mode, only a WE CQI is reported to the eNodeB; and in the periodical frequency-selective reporting mode, both the WE CQI and a best subband (Best Subband Band, hereinafter referred to as SB) CQI are reported.

Figure 2:
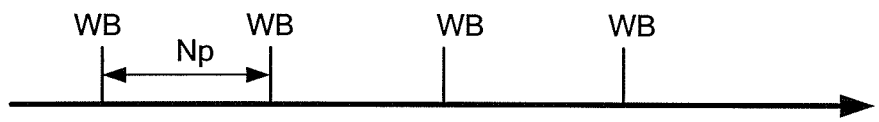
FIG. 2 is a schematic diagram of a frame structure of a periodical wideband reporting mode in a method for reporting channel state information according to an embodiment of the present invention.
Figure 3:
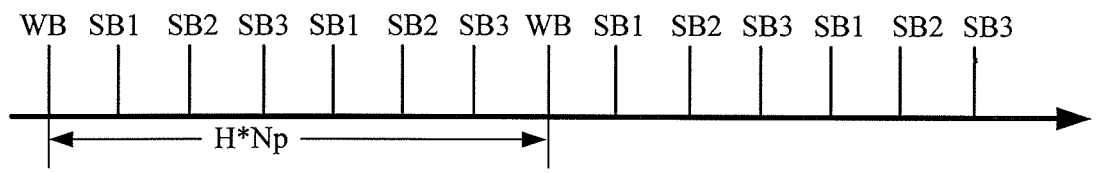
FIG. 3 is a schematic diagram of a frame structure of a periodical frequency-selective reporting mode in a method for reporting channel state information according to an embodiment of the present invention.

FIG. 2 is a schematic diagram of a frame structure of a periodical wideband reporting mode in a method for reporting channel state information according to an embodiment of the present invention. FIG. 3 is a schematic diagram of a frame structure of a periodical frequency-selective reporting mode in a method for reporting channel state information according to an embodiment of the present invention. As shown in FIG. 2 and FIG. 3, $I_{CQI/PMI}$ is a periodic parameter received by a UE and delivered by an eNodeB; Np is a base number for reporting periodicity; and $N_{OFFSET,CQI}$ is a subframe offset value; the value relationship is shown in Table 1. After receiving the periodic parameter $I_{CQI/PMI}$, the UE may calculate out a corresponding reporting periodic Np and a subframe offset $N_{OFFSET,CQI}$ according to Table 1.

TABLE 1

| $I_{CQI/PMI}$ | $N_p$ | $N_{OFFSET, CQI}$ |
|---|---|---|
| $0 \le I_{CQI/PMI} \le 1$ | 2 | $I_{CQI/PMI}$ |
| $2 \le I_{CQI/PMI} \le 6$ | 5 | $I_{CQI/PMI}$ - 2 |
| $7 \le I_{CQI/PMI} \le 16$ | 10 | $I_{CQI/PMI}$ - 7 |
| $17 \le I_{CQI/PMI} \le 36$ | 20 | $I_{CQI/PMI}$ - 17 |
| $37 \le I_{CQI/PMI} \le 76$ | 40 | $I_{CQI/PMI}$ - 37 |
| $77 \le I_{CQI/PMI} \le 156$ | 80 | $I_{CQI/PMI}$ - 77 |
| $157 \le I_{CQI/PMI} \le 316$ | 160 | $I_{CQI/PMI}$ - 157 |
| $I_{CQI/PMI} = 317$ |  | Reserved |
| $318 \le I_{CQI/PMI} \le 349$ | 32 | $I_{CQI/PMI}$ - 318 |
| $350 \le I_{CQI/PMI} \le 413$ | 64 | $I_{CQI/PMI}$ - 350 |
| $414 \le I_{CQI/PMI} \le 541$ | 128 | $I_{CQI/PMI}$ - 414 |
| $542 \le I_{CQI/PMI} \le 1023$ |  | Reserved |

For a specific reporting mode, a reporting period of the WB reporting mode may be Np, and a WB reporting period in the frequency-selective reporting mode may be H×Np, where H=J×K+1. In the frequency-selective reporting mode, a whole WB is divided into J bandwidth parts (Bandwidth part, hereinafter referred to as EP), and each EP includes multiple subbands. In each EP, only one best subband (Best Subband, hereinafter referred to as SB) is selected for reporting. K represents the number of reporting repetition of an SB. As shown in FIG. 3, J=3, and K=2, namely, SBs of 3 BPs are reported in total, and reporting of an SB is repeated twice.

If a WE PMI needs to be reported, the WE PMI may be reported together with a WB CQI in an uplink subframe in which the WB CQI is reported. Therefore, for each downlink CC, contents that need to be reported may include: 4-bit WE CQI; 4-bit SB CQI and 1-bit or 2-bit SB position information; 4-bit SB CQI, 3-bit second-codeword (Codeword, hereinafter referred to as CW) differential SB CQI, and 1-bit or 2-bit SB position information; 6-bit two-antenna WB CQI/PMI; 8-bit four-antenna WE CQI/PMI; 5-bit two-antenna WE CQI/PMI, 3-bit second-CW differential WE CQI; 8-bit four-antenna WB CQI/PMI; and 3-bit second-CW differential WE CQI.

Step 102: Send reported information to an eNodeB on a physical uplink control channel (PUCCH) of an uplink subframe, where the reported information includes at least part of CSI of each downlink CC in at least two CCs of the multiple downlink CCs.

Specifically, in a frequency division duplex (Frequency Division Duplex, hereinafter referred to as FDD) mode, a minimum reporting period of CSI of one downlink CC is 2 ms, where the CSI of the downlink CC needs to be reported. Therefore, to support a required short reporting period of multiple downlink CCs, it is inevitable that CSI of multiple CCs needs to be reported simultaneously on the PUCCH resource of each uplink subframe of one uplink CC. When CSI of at least two uplink CCs needs to be sent to the eNodeB on the PUCCH of one uplink subframe, a reporting conflict occurs. In a CA scenario, feedback amount is large when a UE reports CSI of multiple downlink CCs periodically. In the prior art, uplink control information (Uplink Control Information, hereinafter referred to as UCI) of CSI is transmitted by using a PUCCH format 2, and with adopted RM coding, at most 11-bit data information can be transmitted in one uplink subframe. Therefore, in one uplink subframe, it is possible that the total number of bits of CSI of multiple downlink CCs exceeds 11, where the CSI of the multiple downlink CCs needs to be reported. To solve this problem, in the prior art, CSI of a certain or several downlink CCs is dropped as a whole according to priorities of downlink CCs, where the CSI of the certain or several downlink CCs needs to be reported; and the UE reports only CSI of a downlink CC with a higher priority. Therefore, in the prior art, CSI of a downlink CC with a lower priority cannot be reported in a long period. Furthermore, because a loss of reported CSI is great, reporting precision is low.

In comparison, in this embodiment, the UE may obtain a reporting period and a subframe offset that are corresponding to the periodic parameter by querying Table 1. After obtaining CSI of multiple downlink CCs that needs to be reported, the UE may perform controlling processing on the CSI of the multiple downlink CCs that needs to be reported, according to the reporting mode, reporting period, and subframe offset. Through the controlling process, information that is to be reported and is transmitted on the PUCCH of each uplink subframe may include at least part of the CSI of the multiple downlink CCs that needs to be reported, and the amount of the reported information is controlled to be less than or equal to resource amount of the PUCCH, for example, less than 11 bits in a conventional PUCCH format 2. Therefore, in this embodiment, CSI of a certain or several downlink CCs is not dropped totally, where the CSI of the certain or several downlink CCs needs to be reported; and CSI of multiple downlink CCs may be transmitted on the PUCCH in a time period.

After obtaining the reported information that is transmitted on the PUCCH of each uplink subframe, the UE may send each uplink subframe to the eNodeB on one uplink CC.

In this embodiment, the UE may perform controlling processing on CSI of at least two downlink CCs that needs to be reported, so that the information that is reported and is transmitted on the PUCCH of each uplink subframe may include part or all of CSI of multiple downlink CCs that needs to be reported, and the UE may report CSI of each downlink CC in one uplink CC in the CA scenario, and reporting precision is high.

In the embodiment, the implementation solution in step 102 generally may be:

When CSI of two or more downlink CCs appears in one uplink subframe, if the total amount of reported information exceeds the resource amount of the PUCCH of the uplink subframe, part of important information in the CSI of one of the downlink CCs is reserved, and part of less important information is dropped. The same processing is performed on another downlink CC. Further, important information in the CSI of these downlink CCs may also be recombined, and the recombined information is reported to the eNodeB. The important information in the CSI may be a WE CQI, a WE PMI, an SB CQI, an SB CQI, an SB label, and so on. Further, when the number of downlink CCs is large, the downlink CCs may be grouped. Different CC groups adopt different subframe offset values. When it is ensured that a shortest reporting period is 2 ms, each uplink subframe only needs to handle a problem that CSI of at most 3 downlink CCs is reported simultaneously. Further, joint coding of a PUCCH format 2 of adjacent subframes may also be adopted. When it is ensured that a shortest reporting period is 2 ms, each uplink subframe only needs to handle a problem that CSI of at most 2.5 downlink CCs is reported simultaneously.

It should be noted that, in this embodiment, the UE and the eNodeB may pre-negotiate a reporting mode and a periodic parameter in advance. For example, the eNodeB may send a reporting mode and a periodic parameter to the UE. Subsequently, when the eNodeB communicates with the UE, the UE only needs to adopt the pre-negotiated reporting mode and periodic parameter, and may report CSI that is needed by the eNodeB to the eNodeB on the PUCCH of an uplink subframe of one uplink CC.

In a specific implementation process, the UE may receive information of reporting mode number or indication information of a reported content beforehand, where the information of the reporting mode number or the indication information of the reported content is sent by the eNodeB, so that the UE may obtain CSI of multiple downlink CCs according to the information of the reporting mode number or the indication information of the reported content.

Specifically, when the eNodeB instructs the UE to report CSI by adopting a predefined reporting mode, the eNodeB only needs to notify the UE of number information of the reporting mode. For example, there are five reporting modes in total. When the eNodeB requires the UE to report CSI by adopting a third reporting mode, the eNodeB may send a reporting mode number 3 in physical layer signaling, radio resource control protocol (Radio Resource Control, hereinafter referred to as RRC) layer signaling, or media access control (Media Access Control, hereinafter referred to as MAC) layer signaling, so that the UE may report the CSI by adopting the third reporting mode. When the eNodeB instructs the UE to report CSI by adopting a reporting mode other than the predefined reporting mode, no information of the reporting mode number is predefined between the eNodeB and the UE. Therefore, the eNodeB may send, in the RRC layer signaling or MAC layer signaling, reported content indication information indicating which CSI needs to be reported by the eNodeB. The reported content indication information may be identifier information of a CQI/PMI, an SB, or an RI and so on, so that the UE may obtain corresponding CSI according to the reported content indication information.

The implementation process that the UE performs controlling processing on the CSI of at least two downlink CCs that is required to be reported is described in detail in the following by adopting several implementation solutions:

Solution 1

If information amount of the CSI of the at least two downlink CCs is less than or equal to resource amount of the PUCCH, the reported information is obtained by recombining or jointly encoding the CSI of the at least two downlink CCs; and if the information amount of the CSI of the at least two downlink CCs is greater than the resource amount of the PUCCH, the reported information is obtained by making selection in the CSI of the at least two downlink CCs.

The making selection of the CSI of the at least two downlink CCs includes: dropping all CSI with a low priority in the CSI of the at least two downlink CCs; or reserving CSI with a high priority in the CSI of the at least two downlink CCs, and recombining or jointly encoding the reserved CSI with all or part of other CSI in the CSI of the at least two downlink CCs.

An example of an application scenario is: CSI of two downlink CCs, namely, a CC1 and a CC2, needs to be reported; a reporting mode of the CC1 is periodical frequency-selective reporting mode, and a reporting mode of the CC2 is periodical wideband reporting mode; their respective reporting periods are 2 ms and 5 ms, and a reporting period of a CC1 WB is 6 ms; and their respective subframe offsets are two subframes and one subframe, and each subframe is 1 ms, namely, subframe offset values are 2 ms and 1 ms. Frame structures of the CC1 and CC2 are shown in FIG. 4.

Figure 4:
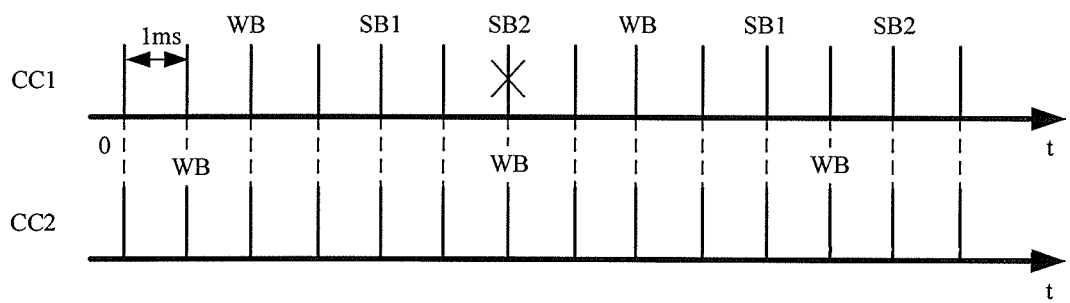
FIG. 4 is a schematic diagram of a frame structure of an uplink subframe in a method for reporting channel state information according to an embodiment of the present invention.

It can be seen from FIG. 4 that, because both the CC1 and CC2 are reported periodically, a reporting conflict that the CC1 and CC2 exist simultaneously in the same uplink subframe is also periodical. A conflict period is the least common multiple of the two, namely, 10 ms. Therefore, the CC1 conflicts with the CC2 on a sixth uplink subframe, a sixteenth uplink subframe, and a twenty-sixth uplink subframe, . . . .

By taking the sixth uplink subframe as an example, contents that need to be reported is an SB2 of the CC1 and a WB of the CC2. Because at most 11-bit information can be transmitted on the PUCCH of one uplink subframe, if a sum of bits of the SB2 of the CC1 and the WB of the CC2 does not exceed 11 bits, for example, a transmission content of the SB2 of the CC1 is 4-bit CQI of a Best SB of the BP2 and 1-bit or 2-bit of SB label, and a transmission content of the WB of the CC2 is 4-bit WB CQI, namely, 4+(1 or 2)+4=9 or 10<11 bits in total, the SB2 of the CC1 and the WB of the CC2 can be reported in the sixth uplink subframe simultaneously. At this time, the UE may recombine CSI that is transmitted on the PUCCH of the uplink subframe, for example, CSI of the CC1 is accommodated in the first 6 bits, and CSI of the CC2 is accommodated in the last 4 bits; or jointly encodes CSI that is transmitted on the PUCCH of the uplink subframe, where the implementation manner of the jointly encoding may be implemented by adopting a conventional technology. If the sum of bits of the SB2 of the CC1 and the WB of the CC2 exceeds 11 bits, for example, if a transmission content of the SB2 of the CC1 is 4-bit CQI of the Best SB of the BP2 and 1-bit or 2-bit SB label, and a transmission content of the WB of the CC2 is 4-bit WB CQI and 4-bit WB PMI, namely, 4+(1 or 2)+4+4=13 or 14>11 bits in total, the UE needs to make selection in the reported content according to a priority order, reserves information about WB of the CC2, and drops information about SB2 of the CC1. In this embodiment, reporting priorities may include: The priority of wideband information is higher than a priority of subband information, a priority of original information of a first codeword is higher than a priority of differential information of a second codeword, and a priority of information reported in a first cycle is higher than a priority of information reported after the first cycle; in the same type of information, a priority of information of a long reporting period is higher than a priority of information of a short reporting period; and a priority of an RI is higher than a priority of a CQI/PMI.

By taking the sixth uplink subframe as an example, because the CC2 is reported by adopting a wideband reporting mode, when the WB of the CC2 conflicts with the SB2 of the CC1, the UE may drop state information of the SB2 of the CC1, where the state information of the SB2 of the CC1 is less important, and the UE may only report state information of the WB of the CC2, where the state information of the WB of the CC2 is more important.

By taking the twenty-sixth uplink subframe as an example, reporting of the WB of the CC2 conflicts with reporting of a WB of the CC1. Because a reporting period of the WB of the CC1 is longer than that of the WB of the CC2, at this time, state information of the WB of the CC2 which is less important is dropped, and state information of the WB of the CC1 which is more important is reserved.

It should be noted that, processing of the sixth uplink subframe and processing of twenty-sixth uplink subframe both adopt a fully dropping processing manner. In this solution, recombining processing may also be adopted, or dropping is combined with recombining, namely, dropping part of CSI of a downlink CC which has a low priority and is transmitted on the PUCCH of the uplink subframe, and recombining or jointly encoding the other CSI of the downlink CC and all or part of CSI of another downlink CC. The recombining processing includes: replacing state information of an SB with state information of a BP and/or accommodating dropped state information in an uplink subframe that has a free bit.

Specifically, at the time of transmitting an SB, both information of the SB itself and information of a position of the SB in a BP need to be transmitted. Therefore, compared with the BP, the SB needs to occupy 1 or 2 bits more than the BP does, and state information of the SB may be replaced with state information of the BP to reduce the number of transmitted bits. State information dropped due to a lower priority may be reported in a subsequent uplink subframe that has a free bit.

Solution 2

The UE divides the multiple downlink CCs into multiple groups. At least one group includes at least two downlink CCs. A group of reported information is generated by CSI of downlink CCs in each group, and each group of reported information is sent to the eNodeB on the PUCCH on multiple uplink subframes respectively.

An example of an application scenario is: four downlink CCs, namely, a CC1, a CC2, a CC3, and a CC4, all need to be reported frequently with a reporting period of 2 ms, where 4-bit WB CQI of each of the CC1 and the CC3 needs to be reported, and a WB CQI and an SB CQI of the CC2 and a WB CQI and an SB CQI of the CC4 need to be reported.

Figure 5:
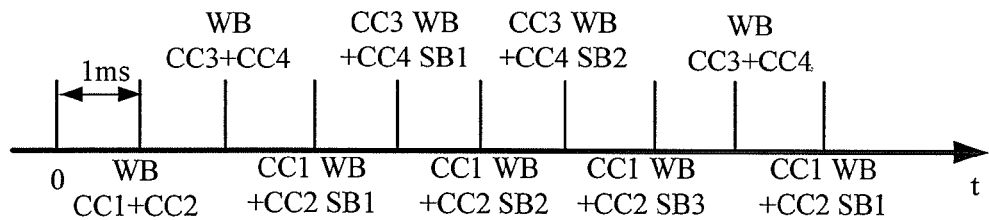
FIG. 5 is a schematic diagram of a frame structure of another uplink subframe in a method for reporting channel state information according to an embodiment of the present invention.

In this solution, the four downlink CCs may be grouped first. For example, the CC1 and the CC2 make up a CC group, and a subframe offset value is 1 ms, namely, one subframe; and the CC3 and the CC4 make up a CC group, and a subframe offset value is two subframes. A frame structure formed by the four downlink CCs grouped is shown in FIG. 5. It can be seen from FIG. 5 that, in each uplink subframe, the amount of reported information is 10 bits at most. Although the four downlink CCs all need to be reported frequently at intervals of 2 ms, the amount of reported information in each uplink subframe is less than 11 bits.

It should be noted that, after the grouping, if the amount of information required to be reported in each uplink subframe still exceeds resource amount of the PUCCH, such as 11 bits, the UE may drop, according to a reporting priority, the information that is to be reported and is transmitted on the PUCCH of the uplink subframe; or replaces state information of an SB with state information of a BP; or accommodates state information that needs to be dropped on the PUCCH of an uplink subframe that has a free bit, thereby ensuring that CSI of multiple downlink CCs can be reported in each uplink subframe.

Solution 3

The UE divides part of multiple downlink CCs into multiple groups. Each group includes at least one downlink CC. CSI of the other part of the multiple downlink CCs is divided into multiple parts. CSI of downlink CCs in each group and each part of CSI of the other part of downlink CCs are respectively used to generate a group of reported information and each group of reported information is sent to the eNodeB on the PUCCH on multiple uplink subframes respectively. Specifically, the UE may jointly encode adjacent uplink subframes, and sends the reported information to the eNodeB on the PUCCH of the uplink subframes that are jointly encoded.

An example of an application scenario is: Five downlink CCs are all reported by adopting a periodical wideband reporting mode, and 4-bit WB CQI information of each downlink CC needs to be reported, and a reporting period is 2 ms.

Figure 6:
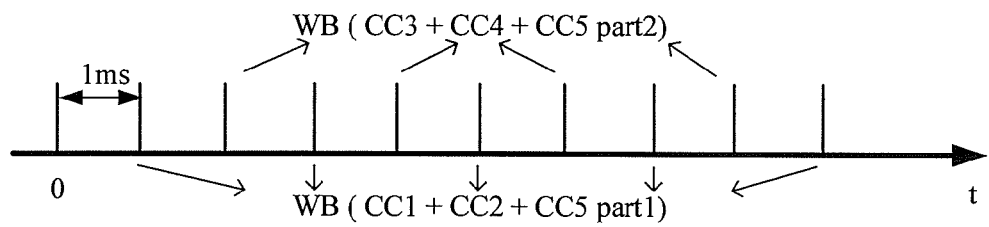
FIG. 6 is a schematic diagram of a frame structure of another uplink subframe in a method for reporting channel state information according to an embodiment of the present invention.

In this solution, the five downlink CCs may be grouped first. For example, a CC1 and a CC2 make up a CC group, and a subframe offset is one subframe; and a CC3 and a CC4 make up a CC group, and a subframe offset is two subframes. 4 bits of CC5 are accommodated in uplink subframes that are corresponding to the two CC groups respectively, and each uplink subframe includes 2 bits of WB CQI of the CC5. A frame structure in this solution is shown in FIG. 6. In this way, only 10-bit state information needs to be reported in each uplink subframe. Then the UE jointly encodes these uplink subframes, and sends the uplink subframes that are jointly encoded to the eNodeB. The eNodeB only needs to jointly decode the uplink subframes that are jointly encoded. The jointly decoding manner may be implemented by adopting a conventional technology, and is not repeated here.

Solution 4

This solution is a combination of the foregoing three solutions.

An example of an application scenario is: Four downlink CCs need to be reported frequently at intervals of 2 ms; a CC1 and a CC2 are reported by adopting a periodical frequency-selective reporting mode, and a CC3 and a CC4 are reported by adopting a periodical wideband reporting mode; and a second CW of the CC3 also needs to be reported.

Figure 7:
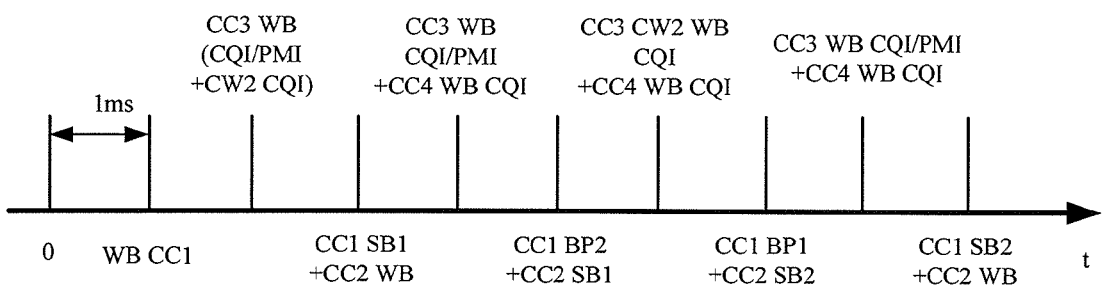
FIG. 7 is a schematic diagram of a frame structure of another uplink subframe in a method for reporting channel state information according to an embodiment of the present invention.

In this solution, the CCs may be grouped. For example, the CC1 and the CC2 make up a CC group, and their respective subframe offsets are one subframe and three subframes; and the CC3 and the CC4 make up a CC group, and their respective subframe offsets are four subframes and two subframes. A frame structure in this solution is shown in FIG. 7. In this way, a reporting conflict between the CC1 and the CC2 may occur only and a reporting conflict between the CC3 and the CC4 may occur only.

In a third uplink subframe and a ninth uplink subframe, the SB1 CQI and the subband position information of the CC1 occupy 4+2 bits=6 bits in total, and plus 4 bits of CC2 WB CQI, 10 bits are in total. The 10 bits can be accommodated in the PUCCH format 2, and do not need to be dropped. In a fifth uplink subframe and a seventh uplink subframe, if both the SB and subband position information of the CC1 and the SB and subband position information of the CC2 are reported, the total amount of reported information exceeds 11 bits, and therefore, part of the information needs to be dropped. Here, for the CC1, a CQI value of a BP is reported in place of an SB CQI, and a subband position does not need to be reported. In the fourth uplink subframe, a WB CQI of the CC4 already occupies 4 bits Therefore, between a WB CQI/PMI of a first CW, namely, a CW1, of the CC3 and a differential WB CQI of a second CW, namely, a CW2, of the CC3, the CQI/PMI of the CW1 needs to be reported preferentially, and 3 bits of differential WB CQI of the CW2 are accommodated in the sixth uplink subframe for reporting.

It can be learned from the specific implementation solutions that, the UE may perform controlling processing on CSI of at least two downlink CCs by adopts dropping processing, grouping processing, jointly encoding processing, or any combination of the foregoing processing, where the CSI of the at least two downlink CCs needs to be reported, so that information that is to be reported and is transmitted on the PUCCH of each uplink subframe may include part of CSI of multiple downlink CCs that needs to be reported, and the number of bits of the reported information is less than or equal to resource amount of the PUCCH. Therefore, the UE may report CSI of each downlink CC in one uplink CC in a CA scenario, and compared with the prior art, reporting precision is high.

Figure 8:
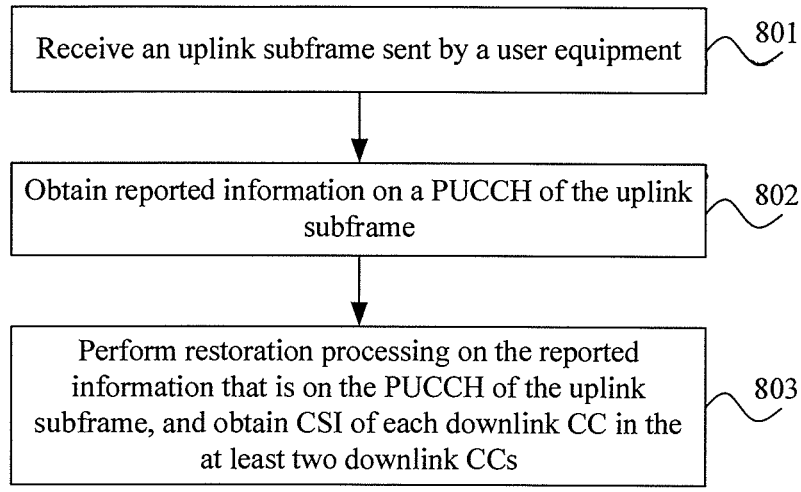
FIG. 8 is a flowchart of a method for obtaining channel state information according to an embodiment of the present invention.

FIG. 8 is a flowchart of a method for obtaining channel state information according to an embodiment of the present invention. As shown in FIG. 8, the method in this embodiment may include:

Step 801: Receive an uplink subframe sent by a user equipment.

Step 802: Obtain reported information on a PUCCH of the uplink subframe.

The reported information includes at least part of CSI of each downlink CC in at least two downlink CCs.

Step 803: Perform restoration processing on the reported information that is on the PUCCH of the uplink subframe, and obtain CSI of each downlink CC in the at least two downlink CCs.

Specifically, in this embodiment, by performing the foregoing steps 801 to 803, an eNodeB may implement a reverse process of a process performed by the UE in FIG. 1. The eNodeB obtains reported information from the PUCCH of each uplink subframe of one uplink CC. According to the report mode, the eNodeB may perform restoration processing on the reported information that is on the PUCCH of multiple uplink subframes jointly to obtain CSI of multiple uplink CCs that needs to be reported.

The restoration processing manner may include: first restoration processing, second restoration processing, and third restoration processing. The first restoration processing includes: using corresponding latest history state information for dropped state information; the second restoration processing includes: according to each downlink CC, splitting or splitting and recombining reported information that is transmitted on the PUCCH of each uplink subframe; and the third restoration processing includes: jointly decoding adjacent uplink subframes.

Specifically, if a reporting mode adopted by the UE is to drop information in a reporting process, and the eNodeB needs to use the dropped information, reference may be made to the latest history state information. For example, in FIG. 4, an SB2 is dropped in a sixth uplink subframe, and in FIG. 7, a CW2 CQI is dropped in a fourth uplink subframe. If the eNodeB needs to use the CW2 CQI, reference may be made to a CW2 CQI in a second uplink subframe, and if the eNodeB needs to use the CW1 CQI/PMI that is dropped on the sixth uplink subframe, reference may be made to a fourth uplink subframe.

For a scenario shown in FIG. 5, a reporting mode is to group multiple downlink CCs, and therefore, the eNodeB may split reported information that is in each uplink subframe according to a CC1 and a CC2, to obtain CSI of the CC1 and CSI of the CC2 respectively.

For a scenario shown in FIG. 6, a reporting mode is to group and recombine CSI of multiple downlink CCs, and then jointly encode the CSI of multiple downlink CCs after recombining, and then reported information that is obtained by the eNodeB through splitting is only part of the CSI. The eNodeB may combine received information of two adjacent subframes, then jointly decodes the received reported information of two adjacent subframes, and then splits, according to the five downlink CCs, the reported information after jointly decoding, and combines two parts of CSI of the CC5 to obtain CSI of the five downlink CCs.

For a reporting mode in a scenario shown in FIG. 7, in addition to performing splitting according to the foregoing CC group, and referring to a history value and a recombining manner, the eNodeB may also compare a received BP WB CQI value with a latest SB CQI history value reported in the BP, and selects a best one for frequency selection of different BPs.

In specific implementation, the eNodeB and the UE may pre-negotiate a reporting mode, which is adopted by the UE, in advance. Therefore, after receiving the uplink subframe, the eNodeB may perform restoration processing on the reported information, by adopting a corresponding restoration processing manner or a combination of these restoration processing manners.

In this embodiment, the eNodeB may perform restoration processing on CSI that is reported on the PUCCH of each uplink subframe of one uplink CC, by referring to a history value, performing splitting according to the CC group, jointly decoding, recombining information, or any combination of the foregoing processing. Therefore, CSI of multiple downlink CCs may be obtained from one uplink CC in a CA scenario.

Figure 9:
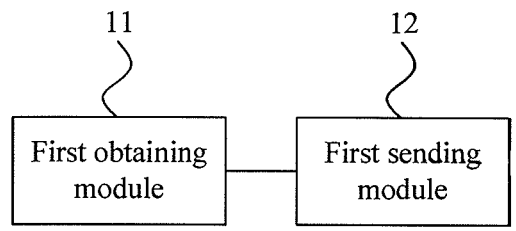
FIG. 9 is a schematic structural diagram of a user equipment according to an embodiment of the present invention.

FIG. 9 is a schematic structural diagram of a user equipment according to an embodiment of the present invention. As shown in FIG. 9, the UE in this embodiment may include a first obtaining module 11 and a first sending module 12. The first obtaining module 11 is configured to obtain CSI of multiple downlink CCs; and the first sending module 12 is configured to send reported information to an eNodeB on a physical uplink control channel (PUCCH) of an uplink subframe, where the reported information includes at least part of CSI of each downlink CC in at least two CCs of the multiple downlink CCs.

The UE in this embodiment may implement the technical solution in the method embodiment shown in FIG. 1, and an implementation principle is similar and details are not repeated here.

In this embodiment, the UE may perform controlling processing on CSI of at least two downlink CCs that needs to be reported, so that the information that is to be reported and is transmitted on the PUCCH of each uplink subframe may include part of CSI of multiple downlink CCs that needs to be reported, and the number of bits of the reported information is less than or equal to resource amount of the PUCCH, and the UE may report CSI of each downlink CC in one uplink CC in a CA scenario, and reporting precision is high.

Figure 10:
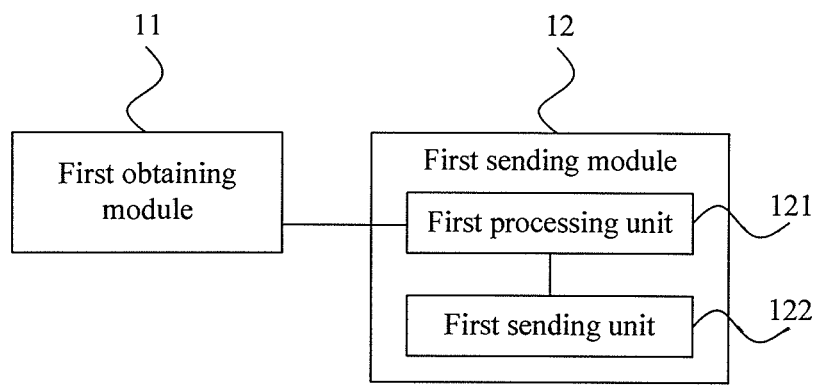
FIG. 10 is a schematic structural diagram of a user equipment according to another embodiment of the present invention.

FIG. 10 is a schematic structural diagram of a user equipment according to another embodiment of the present invention. As shown in FIG. 10, on the basis of the UE shown in FIG. 9, the first sending module 12 of the UE in this embodiment further includes a first processing unit 121 and a first sending unit 122. The first processing unit 121 is configured to: divide the multiple downlink CCs into multiple groups, and generate a group of reported information by using CSI of a downlink CC in each group; or, divide part of multiple downlink CCs into multiple groups, divide CSI of the other part of the multiple downlink CCs into multiple parts, and generate a group of reported information respectively by using CSI of a downlink CC in each group and each part of CSI of the other part of downlink CCs; or configured to: if information amount of CSI of the at least two downlink CCs is less than or equal to the resource amount of the PUCCH, obtain the reported information by recombining or jointly encoding the CSI of the at least two downlink CCs; or, if information amount of CSI of the at least two downlink CCs is greater than the resource amount of the PUCCH, obtain the reported information by making selection in the CSI of the at least two downlink CCs. The first sending unit 122 is configured to send, according to a reporting period and a subframe offset, an uplink subframe processed by the first processing unit 121.

The UE in this embodiment may implement one of solutions 1 to 4 in the method embodiment shown in FIG. 1, and an implementation principle is similar and details are not repeated here.

In this embodiment, the UE may perform controlling processing on CSI of at least two downlink CCs that needs to be reported, by adopting dropping processing, grouping processing, jointly encoding processing, or any combination of the foregoing processing, so that the information that is to be reported and is transmitted on the PUCCH of each uplink subframe may include part of CSI of multiple downlink CCs that needs to be reported, and the number of bits of the reported information is less than or equal to the resource amount of the PUCCH. Therefore, the UE may report CSI of each downlink CC in one uplink CC in a CA scenario, and compared with the prior art, reporting precision is high.

Figure 11:
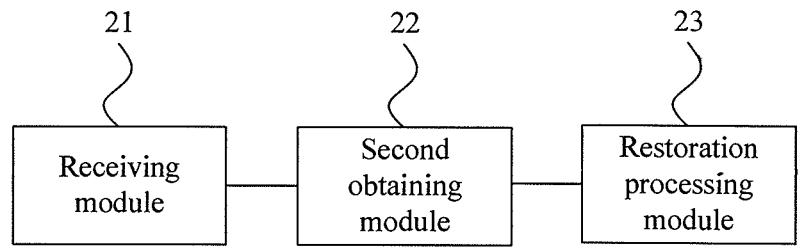
FIG. 11 is a schematic structural diagram of an eNodeB according to an embodiment of the present invention.

FIG. 11 is a schematic structural diagram of an eNodeB according to an embodiment of the present invention. As shown in FIG. 11, the eNodeB in this embodiment may include a receiving module 21, a second obtaining module 22, and a restoration processing module 23. The receiving module 21 is configured to receive an uplink subframe sent by a user equipment; the second obtaining module 22 is configured to obtain reported information that is on a physical uplink control channel (PUCCH) of the uplink subframe, where the reported information includes at least part of CSI of each downlink CC in at least two downlink CCs; and the restoration processing module 23 is configured to perform restoration processing on the reported information that is on the PUCCH of the uplink subframe, and obtain CSI of each downlink CC in the at least two downlink CCs.

The restoration processing module 23 may specifically be configured to perform at least one of the following types of restoration processing: first restoration processing, second restoration processing, and third restoration processing. The first restoration processing includes: using corresponding history state information as dropped state information; the second restoration processing includes: according to each downlink CC, splitting or splitting and recombining reported information that is transmitted on the PUCCH of each uplink subframe; and the third restoration processing includes: jointly decoding adjacent uplink subframes.

The eNodeB in this embodiment may implement the technical solution in the method embodiment shown in FIG. 8, and an implementation principle is similar and details are not repeated here.

In this embodiment, the eNodeB may perform restoration processing on CSI that is reported on the PUCCH of each uplink subframe of an uplink CC, by referring to a history value, performing splitting according to the CC group, jointly decoding, recombining information, or any combination of the foregoing processing. Therefore, CSI of multiple downlink CCs may be obtained from one uplink CC in a CA scenario.

Figure 12:
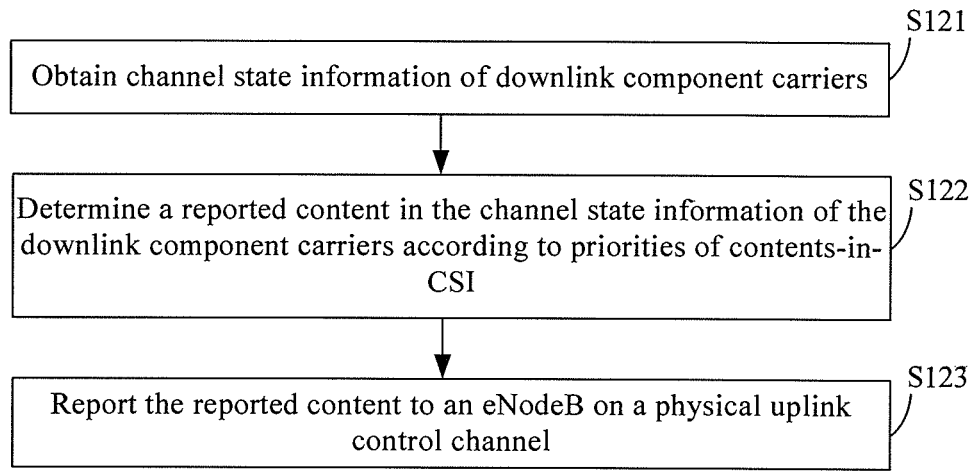
FIG. 12 is a schematic diagram of another method for reporting channel state information according to an embodiment of the present invention.

FIG. 12 is a schematic diagram of another method for reporting channel state information according to an embodiment of the present invention. The method includes:

S121: Obtain channel state information (CSI) of downlink component carriers. Specifically, a UE may obtain CSI of one or more component carriers through detection.

S122: Determine a reported content in the CSI of the downlink component carriers according to priorities of contents-in-CSI. The reported content may be a content with a higher priority in the CSI.

S123: Report the reported content to an eNodeB on a physical uplink control channel (PUCCH).

By adopting this technical solution, the UE may determine, according to the priorities of the contents-in-CSI, part of contents in the CSI for reporting, and other contents other than the reported content in the CSI of the downlink component carriers are contents that are not to be reported, which reduces the amount of reported information. Compared with the prior art in which CSI is sorted according to a CC priority and CSI of a certain or multiple CCs is dropped, with this method, CSI of some CCs are not drop as a whole, and a case that information of some CCs cannot be reported in a long period does not occur, so that CSI of multiple CCs are reported, and at the same time, a reporting resource is saved.

In this embodiment, the UE may assign different priorities to CSI of one or more CCs selectively according to contents, and in this way, one or more contents with a higher priority may be reported to the eNodeB and a content of CSI with a lower priority is dropped selectively. Information of multiple CCs of the UE may make up CSI together. A reporting process of the CSI may be performed on the PUCCH of an uplink subframe, so that the eNodeB obtains the content of CSI with a higher priority in CSI of these CCs. This solution is applicable to a scenario that information amount of CSI of multiple CCs is greater than the amount of resources used for reporting the CSI. Specifically, the UE may obtain information of multiple CCs that is to be reported, namely, CSI of the multiple CCs, through detection or in another manner. When the CSI of the multiple CCs needs to be reported in the same subframe and the amount of information required to be reported exceeds the amount of resources for reporting the CSI, the solution in this embodiment may be applied, to relieve the shortage of a reporting resource. Definitely, in another application scenario, the method may also be used to reduce a reporting resource occupied by a reported content, which is not limited to the scenario exemplified in this embodiment.

The CSI includes multiple different contents. For the CSI, two kinds of information that are different in function or mode at the time of reporting may be regarded as different contents. Contents of the CSI may include different types of information, and multiple contents that belong to the same type of information but has different reporting periods may also be regarded as different contents to be reported. Reported information in different cycles (for example, a CQI to be reported in a first cycle and a CQI to be reported in each cycle after the first cycle) may also be regarded as different contents to be reported. Priorities of these contents may be set by persons skilled in the art, for example, according to any one of or any combination of the following rules:

a rank indicator (RI)>a wideband CQI and/or a wideband PMI>a subband CQI and/or a subband PMI;

a rank indicator (RI)>a wideband CQI and/or a wideband PMI>a wideband spatial differential CQI>a subband CQI and/or a subband PMI>a subband spatial differential CQI;

a rank indicator (RI)>a wideband CQI and/or a wideband PMI>a subband CQI and/or a subband PMI>a wideband spatial differential CQI>a subband spatial differential CQI;

information of a long reporting period in a type of information>information of a short reporting period in the type of information;

a rank indicator (RI)>a wideband CQI and/or a wideband PMI>a subband CQI and/or a subband PMI, and in each type of information, a priority of information of a long reporting period is higher than a priority of information of a short reporting period;

a rank indicator (RI)>a wideband CQI and/or a wideband PMI>a wideband spatial differential CQI>a subband CQI and/or a subband PMI>a subband spatial differential CQI, and in each type of information, a priority of information of a long reporting period is higher than a priority of information of a short reporting period;

a rank indicator (RI)>a wideband CQI and/or a wideband PMI>a subband CQI and/or a subband PMI>a wideband spatial differential CQI>a subband spatial differential CQI, and in each type of information, a priority of information of a long reporting period is higher than a priority of information of a short reporting period; and reported information in a first cycle>reported information after the first cycle.

Through the foregoing priority assignment, one content of CSI with a highest priority or more contents with highest priorities may be reported preferentially, and CSI information with a relatively lower priority or less important CSI information may be dropped or temporarily stored. The temporarily stored information is in a temporary storage device for subsequent processing, and the information that does not need to be reported may be overwritten by detected CSI obtained through detection next time. The following is briefly described by using an example. Wideband CSI is an average of multiple pieces of subband CSI, but different pieces of subband CSI are greatly different from each other. Therefore, when some subband information is dropped, a wideband value may be used to replace the dropped information, the loss of system throughput is not too large, and in an application scenario, a wideband priority may be set to a higher value. For another example, in the CSI, a gain caused by an RI is the greatest, and if the RI is dropped, the loss is the largest, so a priority set for the RI is higher than a priority of a CQI and a priority of a PMI, and a priority order may be sorted according to the contribution made to the throughput gain of the whole system, which is not limited in this embodiment.

To facilitate understanding of persons skilled in the art, the following is briefly described for a scenario. It is assumed that priorities of contents of CSI are set as follows: a rank indicator (RI)>a wideband CQI and a wideband PMI>a subband CQI and a subband PMI>a wideband spatial differential CQI>a subband spatial differential CQI, the UE may selectively determine one or more contents in the contents of the CSI for reporting. Specifically, the UE may select a content with a highest priority in the CSI, for example, select a rank indicator (RI) for reporting; while another content, such as a CQI or a PMI of a wideband or a subband may be regarded as a content that is not to be reported, which is possibly because the amount of reported resources is only enough for reporting the RI at this time. If the amount of reported resources can satisfy more requirements, the UE may also report more contents, for example, reports multiple contents with highest priorities, such as a rank indicator (RI), a wideband CQI, a wideband PMI, a subband CQI, and a subband PMI, while a wideband spatial differential CQI and a subband spatial differential CQI that have a lower priority may not be reported. Definitely, these examples are only illustrative descriptions, but are not intended to limit the present invention. Persons skilled in the art may adaptively adjust how to distinguish the reported content from the content that is not to be reported in all the contents. That is, a reported content is determined by making a division among multiple contents with different priorities according to an actual requirement. The principle based on which the reported content is determined may be as described in the foregoing. The contribution to throughput of a communication system is considered, for example, a content that makes greater contribution to improvement of the throughput of the communication system has a higher priority. Definitely, a specific implementation principle is not limited in this embodiment, and may be another principle that is useful for communication implementation. In this embodiment, the UE may reduce the loss caused by fully dropping CSI of a certain CC, so that a requirement of reporting information of multiple CCs in a CSI reporting process is satisfied.

Figure 13:
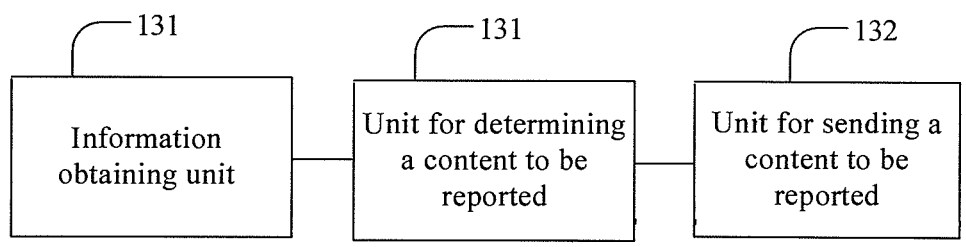
FIG. 13 is a schematic diagram of another user equipment according to an embodiment of the present invention.

FIG. 13 is a schematic diagram of another user equipment according to an embodiment of the present invention. The user equipment includes: an information obtaining unit 131, configured to obtain channel state information (CSI) of downlink component carriers; a unit for determining a reported content 132, configured to determine a reported content in the CSI of the downlink component carriers according to priorities of contents-in-CSI, where a content other than the reported content in the CSI of the downlink component carriers is a content that is not to be reported; and a unit for sending a reported content 133, configured to report the reported content to an eNodeB on a physical uplink control channel (PUCCH). The unit for sending a reported content 133 may include: a determining module, configured to determine one content with a highest priority or more contents with highest priorities in the CSI as the reported content according to the priorities of the contents-in-CSI. The user equipment may further include a storage unit, configured to store the content that is not to be reported, for subsequent processing or dropping. As described in the foregoing, the dropping may not be an action on the user equipment's own initiative. Instead, after obtaining new CSI through detection, the user equipment stores a content of the new CSI into the storage unit to overwrite the content that is not to be reported and is dropped previously.

Persons of ordinary skill in the art may understand that all or part of the steps of the foregoing method embodiments may be implemented by a program instructing relevant hardware. The foregoing program may be stored in computer readable storage medium. When the program runs, the steps of the foregoing method embodiment are executed. The foregoing storage medium may include any medium capable of storing program codes, such as a ROM, a RAM, a magnetic disk, or an optical disk.

Finally, it should be noted that the foregoing embodiments are only used for describing the technical solutions of the present invention, but are not intended to limit the present invention. Persons skilled in the art should understand that although the present invention is described in detail with reference to the foregoing embodiments, modifications may still be made to the technical solutions described in each foregoing embodiment, or equivalent replacements may be made to part of technical features in the technical solutions. However, such modifications or replacements do not make the essence of the corresponding technical solutions depart from the spirit and scope of the technical solution in each embodiment of the present invention. Persons skilled in the art may understand that different embodiments of the present invention may be combined together if no logical conflict occurs.

What is claimed is:

1. A method for reporting channel state information CSI, the method comprising:
  obtaining CSI of downlink component carriers;
  identifying a reported content and a non-reported content from all contents included in the CSI of the downlink component carriers according to priorities of contents-in-CSI, wherein the priorities of the contents-in-CSI are set as follows: a rank indicator RI greater than a wideband channel quality indicator CQI greater than a subband CQI;
  reporting the reported content to an eNodeB on a physical uplink control channel PUCCH; and
  dropping the non-reported content.

2. The method according to claim 1, wherein identifying the reported content and the non-reported content from all the contents included in the CSI of the downlink component carriers according to the priorities of contents-in-CSI comprises:
  identifying the reported content and the non-reported content from all the contents included in CSI of multiple downlink component carriers according to the priorities of the contents-in-CSI when the CSI of the multiple downlink component carriers needs to be reported in a same uplink subframe.

3. The method according to claim 2, wherein identifying the reported content and the non-reported content from all the contents included in the CSI of the multiple downlink component carriers according to the priorities of contents-in-CSI when the CSI of the multiple downlink component carriers needs to be reported in the same uplink subframe comprises:
  identifying the reported content and the non-reported content from all the contents included in the CSI of the multiple downlink component carriers according to the priorities of the contents-in-CSI when the CSI of the multiple downlink component carriers needs to be reported in the same uplink subframe and information amount of the CSI of the multiple downlink component carriers is greater than resource amount used for reporting the CSI.

4. The method according to claim 1, wherein identifying the reported content and the non-reported content from all the contents included in the CSI of the downlink component carriers according to the priorities of contents-in-CSI comprises:
  identifying one content with a highest priority or more contents with highest priorities in the CSI of the downlink component carriers as the reported content according to the priorities of the contents-in-CSI, and identifying at least one other content except for the identified reported content in the CSI of the downlink component carriers as the non-reported content.

5. The method according to claim 1, wherein the priorities of the contents-in-CSI are further set as follows:

the RI greater than the wideband CQI, and further greater than the subband CQI in combination with a subband precoding matrix indicator PMI.

6. A user equipment, comprising:

an information obtaining unit, configured to obtain channel state information CSI of downlink component carriers;

a unit for determining a reported content, configured to identify a reported content and a non-reported content from all contents included in the CSI of the downlink component carriers according to priorities of contents-in-CSI, wherein the priorities of the contents-in-CSI are set as follows: a rank indicator RI greater than a wideband channel quality indicator CQI greater than a subband CQI;

a unit for sending a reported content, configured to report the reported content to an eNodeB on a physical uplink control channel PUCCH; and a storage unit, configured to store the non-reported content for dropping.

7. The user equipment according to claim 6, wherein the unit for determining a reported content comprises:

a determining module, configured to identify one content with a highest priority or more contents with highest priorities in the CSI of the downlink component carriers as the reported content according to the priorities of the contents-in-CSI, and identify at least one other content except for the identified reported content in the CSI of the downlink component carriers as the non-reported content.

8. The user equipment according to claim 6, wherein the priorities of the contents-in-CSI are further set as follows:

the RI greater than the wideband CQI, and further greater than the subband CQI in combination with a subband precoding matrix indicator PMI.

* * * * *